(12) United States Patent
Mohler

(10) Patent No.: US 6,175,859 B1
(45) Date of Patent: Jan. 16, 2001

(54) SENDER-DEFINED TIME FOR REPORTING ON THE STATUS OF A SENT MESSAGE OR OF THE MESSAGE'S RECIPIENT

(75) Inventor: David S. Mohler, Bedminster, NJ (US)

(73) Assignee: Avaya Technology Corp., Miami Lakes, FL (US)

( * ) Notice: Under 35 U.S.C. 154(b), the term of this patent shall be extended for 0 days.

(21) Appl. No.: 09/181,796

(22) Filed: Oct. 28, 1998

(51) Int. Cl.⁷ ....................................................... G06F 13/00
(52) U.S. Cl. ............................................................. 709/206
(58) Field of Search ..................................... 709/206, 207

(56) References Cited

U.S. PATENT DOCUMENTS 5,428,784 * 6/1995 Cahill, Jr. .............................. 709/206
6,108,688 * 8/2000 Nielsen et al. ........................ 709/206

FOREIGN PATENT DOCUMENTS

| 0371605 | 6/1990 | (EP) | ............................. | H04L/12/54 |
| 0371607 | 6/1990 | (EP) | ............................. | H04L/12/54 |
| 0458717 | 11/1991 | (EP) | ............................. | H04L/12/00 |
| 0813161 | 12/1997 | (EP) | ............................. | G06F/17/60 |

OTHER PUBLICATIONS

Lotus Development Corporation, Lotus Notes Help, Confirming that Notes delivered your message, page 1.
Lotus Development Corporation, Lotus Notes Help, Confirming that recipients read your message, page 1.
Lotus Development Corporation, Lotus Notes Help, Details: Displaying delivery information about a message, page 1.

* cited by examiner

Primary Examiner—Robert B. Harrell
(74) Attorney, Agent, or Firm—David Volejnicek

(57) ABSTRACT

The sender (101) of a message is able to specify to the recipient's messaging system (112) or to the sender's own messaging system (102) a reply time at which the sender wishes to be informed of whether or not the recipient (111) has accessed the sent message. The reply time is included (204, 304) in the message. Upon occurrence (220) of the response time, the recipient's messaging system checks if the recipient has accessed (222) the message, and if not, whether the recipient's present schedule (115) is available (226). It then sends (232) a reply (224, 230), with the schedule if it is available (228), to the sender. Upon occurrence (320) of the response time, the sender's messaging system checks (322) if a reply has been received from the recipient, and if so, whether it indicates (324) that the message has been accessed and whether it contains (328) the recipient's schedule. It then notifies (330) the sender accordingly. The schedule preferably contains information that enables the sender to contact the recipient by other ways.

6 Claims, 3 Drawing Sheets

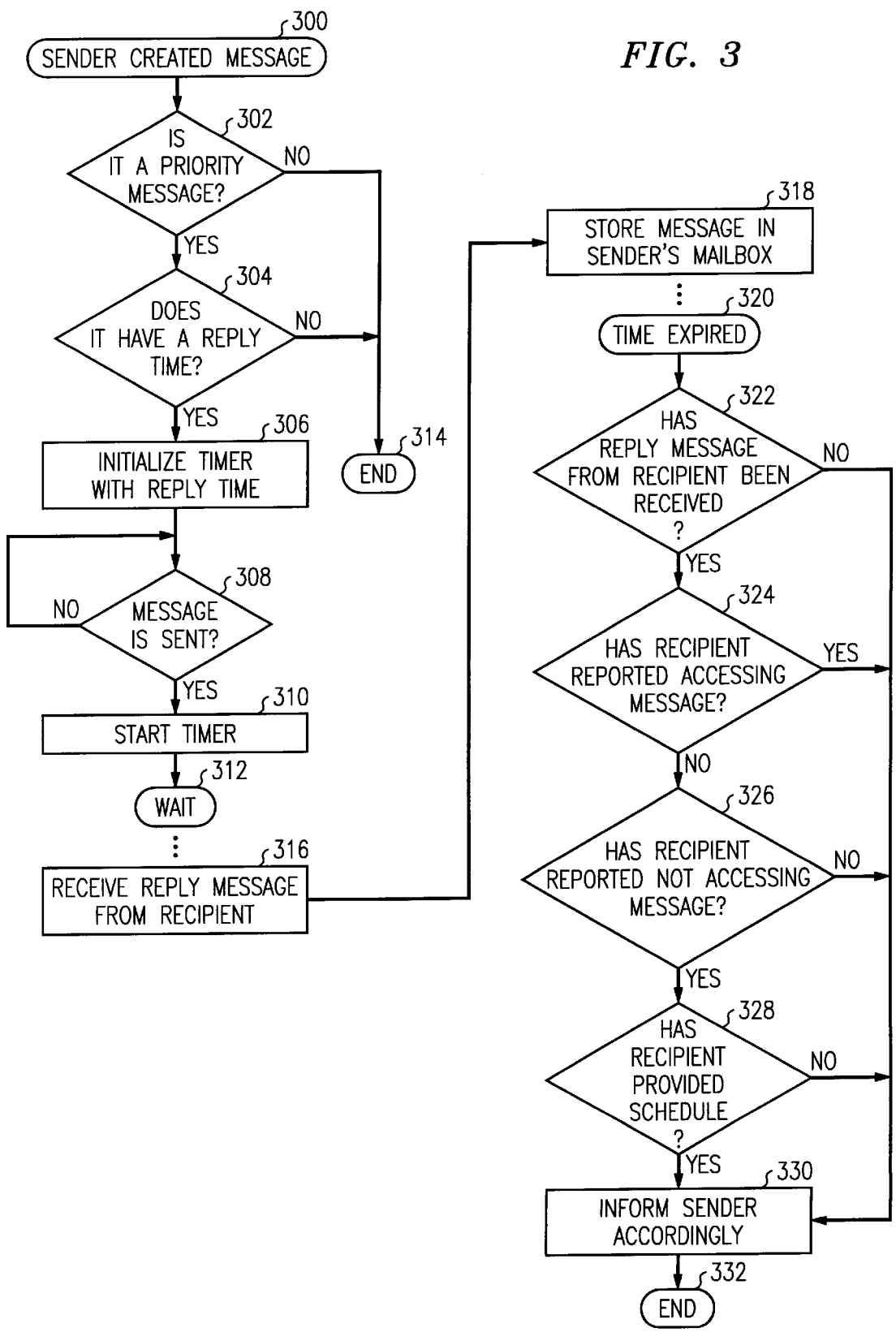

SENDER-DEFINED TIME FOR REPORTING ON THE STATUS OF A SENT MESSAGE OR OF THE MESSAGE'S RECIPIENT

TECHNICAL FIELD

This invention relates to electronic messaging and mail systems.

BACKGROUND OF THE INVENTION

The sender of an electronic message typically does not know whether or not the recipient has accessed the received message until the recipient takes some action—e.g., sends an acknowledgement message back to the sender—that is indicative of message receipt. If the message is urgent, the sender would like to know whether the message was accessed in time or whether follow-up using a different communications means is required. Some existing messaging systems have the capability of automatically sending an acknowledgment message from the recipient to the sender when the sender's message is received and/or when the sender's message is accessed by the recipient. While it may be inferred from a lack of the corresponding acknowledgement that the message has not been received or accessed, the lack of an acknowledgement does not provide the sender a positive indication of the message status. Moreover, it still leaves open the question of how and where the recipient can be contacted if the acknowledgement message is not received in time.

SUMMARY OF THE INVENTION

This invention is directed to solving these and other problems and disadvantages of the prior art. Illustratively according to the invention, the sender of a message is enabled to specify—to the recipient's messaging system and/or to his or her own messaging system—a reply time at which he or she wishes to be informed of whether or not the recipient has accessed (e.g., retrieved or read) the sent message. If the recipient has not accessed the message by the reply time, the sender is preferably informed of the recipient's present schedule, thereby enabling the sender to contact the recipient by other means.

Generally according to one aspect of the invention, receipt (e.g., by a recipient's messaging system) of a message from a sender for a recipient, which includes a reply time specified by the sender, initiates monitoring for occurrence of the reply time. Upon occurrence of the reply time, it is determined whether or not the recipient has accessed the message, and a reply informing the sender accordingly is sent to the sender. Preferably, in response to a determination that the recipient has not accessed the message, the recipient's schedule is obtained and sent with the reply. The schedule preferably contains information that enables the sender to contact the recipient by other means (e.g., a telephone, pager, or facsimile number of the recipient's present location).

Generally according to another aspect of the invention, sending (e.g., by a sender's messaging system) of a message from a sender to a recipient, which includes a reply time specified by the sender, initiates monitoring for occurrence of the reply time. Upon occurrence of the reply time, it is determined whether a reply has been received from the recipient, and the sender is informed accordingly. Preferably, in response to determining that a reply has been received, a determination is made of whether it indicates that the recipient has or has not accessed the message, and if it indicates that the recipient has not accessed the message, it is further determined whether the reply includes a schedule of the recipient. The sender is then informed accordingly. Again, the schedule preferably contains information that enables the sender to contact the recipient by other means.

In either case, the invention informs the sender of the status of his or her message at a time of the sender's choosing, and preferably also informs the sender of the recipient's status—i.e., their schedule—so that the sender can reach the recipient by alternative means. Moreover, the sender's and recipient's systems need not have corresponding capabilities; rather, either one of the messaging systems is alone capable of providing the basic enhanced functionality to the sender.

The invention encompasses both methods and apparatuses that effect the functionality characterized above. The apparatus preferably includes an effector—any entity that effects the corresponding step, unlike a means—for each method step. Further, the invention encompasses a computer-readable medium containing software which, when executed in a computer, causes the computer to perform the method steps.

These and other features and advantages of the present invention will become evident from the following description of an illustrative embodiment of the invention considered together with the drawing.

BRIEF DESCRIPTION OF THE DRAWING

FIG. 3 is a flow diagram of operations of a reply function of a message-sender's electronic messaging system of the communications system of FIG. 1.

DETAILED DESCRIPTION

Figure 1:
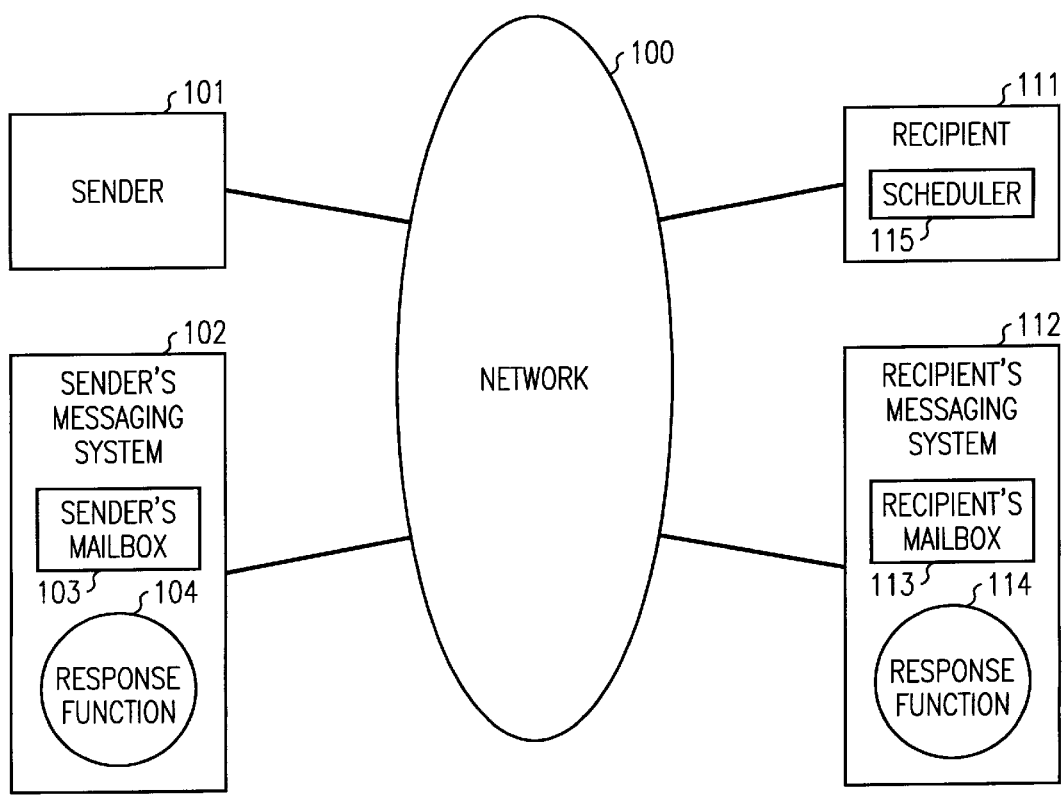
FIG. 1 is a block diagram of a communications system that includes an illustrative embodiment of the invention.

FIG. 1 shows a communications system comprising a sender 101 and the sender's messaging system 102 interconnected by a network 100 with a recipient 111 and the recipient's messaging system 112. The communications system of FIG. 1 can be any desired system. For example, it can be a telecommunications system where network 100 is a public or a private telephone network, sender 101 and recipient 111 are telephones and/or other equipment able to communicate telephonically (e.g., modem-equipped personal computers, message servers, or fax machines), and messaging systems 103 are voice messaging or multimedia messaging systems. Or, it can be a data communications system where network 100 is a data network such as an intranet or the Internet, sender 101 and reicpient 111 are data terminals, message servers, or personal computers, and messaging systems 102 and 112 are e-mail systems or multimedia messaging systems. Messaging system 102 defines a message mailbox 103 for sender 101, and messaging system 112 defines a message mailbox 113 for recipient 111.

Sender 101 can generate and leave a message for recipient 111 in one of two ways. Sender 101 can access recipient's messaging system 112 directly through network 100 to leave a message in recipient's mailbox 113. Or, sender 101 can generate a message for recipient 111 on sender's messaging system 102 and then have system 102 access recipient's messaging system 112 through network 100 to transfer the message into recipient's mailbox 113.

According to the invention, one or both messaging systems 102 and 112 are equipped with a function 104 and 114, respectively, for effecting sender-defined time for reporting on the status of a sent message or of the message's recipient. The operations of function 104 are shown in FIG. 3, and the operations of function 114 are shown in FIG. 2.

Figure 2:
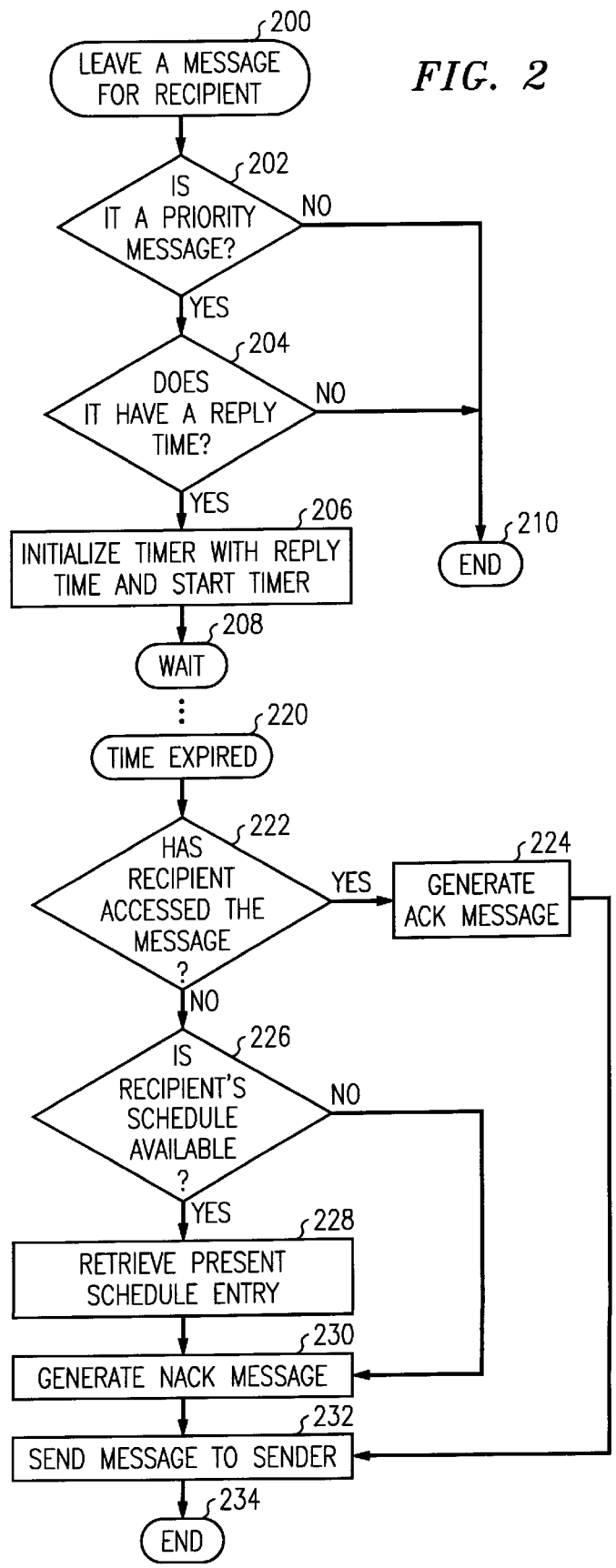
FIG. 2 is a flow diagram of operations of a reply function of a message-recipient's electronic messaging system of the communications system of FIG. 1.

Turning to FIG. 2, execution of function 114 is triggered by leaving of a message for recipient 111 in messaging system 112, at step 200. The message may be left either by transmitting a pre-formed message from sender 101 or sender's messaging system 102 to recipient's messaging system 112, or by generating the message in recipient's messaging system 112 through on-line interaction of system 112 with sender 101. Function 114 checks whether the left message is designated as a priority message, at step 202. If not, execution of function 114 ends for this message, at step 210. If the left message is a priority message, function 114 checks—either by checking a reply time field in the message itself or by inquiring directly of sender 101—whether the message has a reply time associated therewith, at step 204. The reply time may be an absolute time (e.g., 12:30 P.M.) or a relative time (e.g., 30 minutes after receipt). If the message does not have an associated reply time, execution of function 114 ends for this message, at step 210. If the message does have an associated reply time, function 114 uses that time to initialize a timer and starts the timer, at step 206. Function 114 then waits for the reply time to expire, at step 208.

When the timer indicates that the reply time has expired, at step 220, function 114 checks the corresponding message's status in recipient's mailbox 113 to determine if the message has been accessed by recipient 111, at step 222. If yes, then function 114 generates an acknowledgement (ack.) message reporting that fact, at step 224; if not, then function 114 accesses recipient 111 to determine if the schedule of recipient 111 (or rather, of the user of recipient 111) is available, at step 220. If recipient 111 is executing an electronic scheduler 115 (e.g., Microsoft Schedule+, 3Com PalmPilot, or other), the recipient user's schedule is available, and so function 114 retrieves from scheduler 115 the present schedule entry, at step 228, and generates a negative acknowledgement (nack.) message containing that schedule entry and reporting that recipient 111 has not accessed the message yet, at step 230. Of course, recipient 111 may not wish to divulge his or her schedule publicly, in which case scheduler 115 provides only an abbreviated form of the schedule entry, such as a generic message stating "contact me at" followed by a contact address (e.g., phone number) from the schedule entry. If the recipient user's schedule is unavailable, function 114 generates a nack. message reporting that fact and the fact that recipient 111 has not accessed the message yet, at step 230. Alternatively, in the absence of the recipient's schedule, the system may retrieve a "daily generic" response message (e.g., "in meetings", "travelling", etc.) which was directly entered by or for the recipient in a database, and return this message with the nack message. Following the generation of the ack. message at step 224 or of the nack. message at step 230, function 114 causes the generated message to be sent to sender 101 of the original message, at step 232. Execution of function 114 for this message then ends, at step 234. Turning to FIG. 3, execution of function 104 is triggered by creation of a message by sender 101 in sender's messaging system 102, at step 300. Function 104 checks whether the created message is designated as a priority message, at step 302. If not, execution of function 104 ends for this message, at step 314. If the message is a priority message, function 104 checks whether the message has a reply time associated therewith, at step 304. If the message does not have an associated reply time, execution of function 104 ends for this message, at step 314. If the message does have an associated reply time, function 104 uses it to initialize a timer, at step 306. Function 104 then waits for the message to be sent to a recipient 111, at step 308, and then starts the timer, at step 310, and waits for the reply time to expire, at step 312. If during its wait a reply message to the sender's message is received by system 102 from recipient 111 or recipient's system 112, at step 316, the reply message is stored in mailbox 103 of sender 101, at step 318.

When the timer indicates that the reply time has expired, at step 320, function 104 checks sender's mailbox 103 for presence of any reply message from recipient 111, at step 322. If no reply has been received, function 104 causes sender 101 to be informed accordingly, at step 330. This may involve, for example, setting off an alarm, such as lighting the sender's message-waiting lamp, and delivering a corresponding message when sender 101 responds to the alarm and accesses mailbox 103, or sending a corresponding message to sender 101 for display on the sender's display. If a response message has been received from recipient 111, function 104 checks its contents to determine if it is an ack. message, at step 324, or a nack message, at step 326, and whether it contains an entry of the recipient's schedule, at step 328. Function 104 causes sender 101 to be alerted and informed accordingly, at step 330. If the message contained recipient schedule information, that information is given to the sender. Function 104 then ends its execution for this message, at step 332. Sender 101 is thus positively notified either that recipient 111 failed to respond or that recipient 111 has or has not accessed the sender's message within the time specified by sender 101. In the case that recipient 111 has provided its present schedule via the nack. reply message, sender 101 can use this information to track down recipient 111 (or, rather, the human user of recipient 111) and communicate with him or her by other means, e.g., a telephone call to a telephone number indicated in the schedule.

Of course, various changes and modifications to the illustrative embodiment described above will be apparent to those skilled in the art. For example, special treatment may be given to urgent messages received from particular senders (e.g., the recipient's boss)—such as returning the recipient's full schedule entry with a nack message while other senders are returned only an abbreviated schedule entry. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A messaging method comprising:

sending a message from a messaging system of a sender to a recipient, including a reply time specified by the sender; in response to the specified reply time, the messaging system of the sender monitoring for occurrence of the reply time;

receiving the message at a messaging system of the recipient;

in response to the specified reply time, the messaging system of the recipient monitoring for the occurrence of the reply time;

upon the occurrence of the reply time, the messaging system of the recipient determining whether the recipient has accessed the message;

in response to determining that the recipient has accessed the message, the messaging system of the recipient sending an ack. reply to the sender;

in response to determining that the recipient has not accessed the message, the messaging system of the recipient determining availability of a schedule of the recipient in response to determining unavailability of the schedule, the recipient's messaging system sending a nack. reply to the sender;

in response to determining availability of the schedule, the recipient's messaging system sending the nack. reply including the schedule to the sender;

receiving any reply sent by the recipient's messaging system at the sender's messaging system;

upon the occurrence of the reply time, the messaging system of the sender determining whether any reply has been received from the recipient;

in response to determining that no reply has been received from the recipient, the messaging system of the sender informing the sender accordingly;

in response to determining that a reply has been received from the recipient, the messaging system of the sender determining whether the reply is an ack. or nack. reply;

in response to determining that the reply is the ack. reply, informing the sender that the recipient has accessed the message;

in response to determining that the reply is the nack. reply, the messaging system of the sender determining whether the reply includes the schedule of the sender;

in response to determining that the message does not include the schedule, the messaging system of the sender informing the sender that the recipient has not accessed the message; and in response to determining that the message includes the schedule, the messaging system of the sender informing the sender that the recipient has not accessed the message and making the schedule available to the sender.

2. The messaging method of claim 1 wherein:

the schedule contains information enabling the sender to contact the recipient by means other than the messaging method.

3. The messaging method of claim 1 wherein:

the schedule contains information enabling the sender to reach the recipient by alternative means.

4. The messaging method of claim 1 wherein:

the schedule contains a contact address at which the recipient may currently be contacted.

5. An apparatus that performs the method of claim 1 or 2 or 3 or 4.

6. A computer readable medium containing software, which, when executed in a computer, causes the computer to perform the method of claim 1 or 2 or 3 or 4.

* * * * *